(12) United States Patent
Zhu

(10) Patent No.: US 11,504,775 B2
(45) Date of Patent: Nov. 22, 2022

(54) MACHINING TOOL

(71) Applicant: AAC Optics Solutions Pte. Ltd., Singapore (SG)

(72) Inventor: Bingke Zhu, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 663 days.

(21) Appl. No.: 16/556,254

(22) Filed: Aug. 30, 2019

(65) Prior Publication Data

US 2021/0053126 A1   Feb. 25, 2021

(30) Foreign Application Priority Data

Aug. 21, 2019   (CN) .......................... 201910773201.8

(51) Int. Cl.
*B23B 27/16* (2006.01)
*B24B 45/00* (2006.01)

(52) U.S. Cl.
CPC .............. *B23B 27/16* (2013.01); *B24B 45/00* (2013.01)

(58) Field of Classification Search
CPC .......... B23B 27/16; B24B 45/00; B24B 5/045
See application file for complete search history.

(56) References Cited

U.S. PATENT DOCUMENTS

| 2019/0134722 A1* | 5/2019 | Machii | .................... B23B 27/14 |
| 2020/0108449 A1* | 4/2020 | Brodski | .................. B23B 51/02 |
| 2020/0206826 A1* | 7/2020 | Shitrit | ..................... B23B 51/02 |

FOREIGN PATENT DOCUMENTS

TW         387285 U      4/2000

* cited by examiner

*Primary Examiner* — Omar Flores Sanchez
(74) *Attorney, Agent, or Firm* — W&G Law Group

(57) ABSTRACT

Provided is a machining tool, including: a tool head, configured to contact a workpiece to be processed and process the workpiece to be processed; a tool shank including a body and a fixing recess formed by recessing from one end of the body in an axial direction of the body; and a fixing shaft including a shaft body formed by extending from the tool head and a shaft extension extending from the shaft body in a direction facing away from the tool head. The shaft extension is inserted into the fixing recess to achieve fixing. At least a portion of the shaft extension has a non-circular cross-section, and a shape of the fixing recess matches a shape of the shaft extension. Compared with the related art, the machining tool of the present disclosure has high processing precision and good reliability.

9 Claims, 2 Drawing Sheets

MACHINING TOOL

TECHNICAL FIELD

The present disclosure relates to the field of processing fixtures, and in particular, to a machining tool.

BACKGROUND

Processing precision is an important indicator in machining operation. A processing fixture used during processing, such as a machining tool, is an important part to achieve the processing precision.

A machining tool in the related art includes a tool shank, a fixing recess formed by recessing along an axial direction of the tool shank, a tool head and a fixing shaft extending from the tool head. The fixing shaft is inserted into the fixing recess to achieve a fixed connection between the tool head and the tool shank. In addition, by reinforcing with glue and by holding the tool shank, the tool head is forced to be in contact with a workpiece to be processed and then the workpiece can be grinded.

However, in the machining tool of the related art, a cross-section of the fixing shaft and a cross-section of the fixing recess are both circular, such that although reinforcement is achieved by the glue, once the glue ages or a force endured by the tool head is excessively large, the fixing shaft and the fixing recess will rotate relative to each other, thereby affecting the processing precision.

Therefore, it is necessary to provide a new machining tool to solve the above technical problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
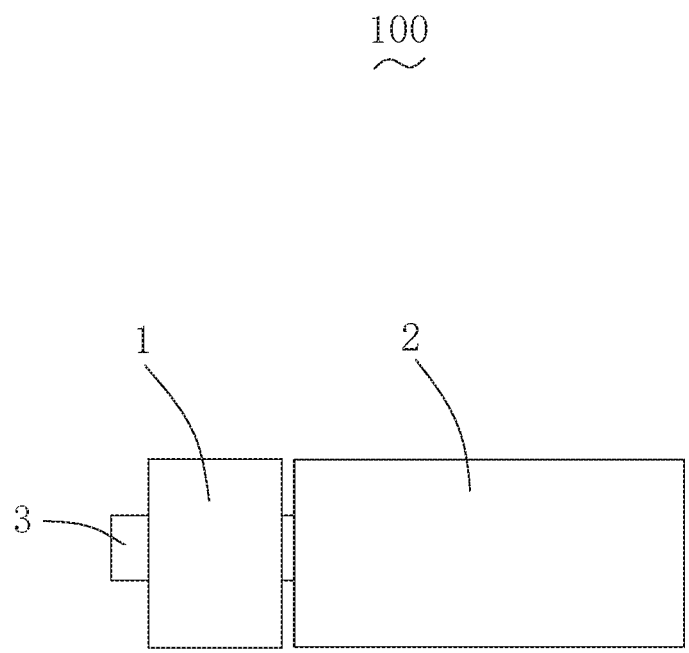
FIG. 1 is a structural schematic view of a machining tool according to an embodiment of the present disclosure.
Figure 2:
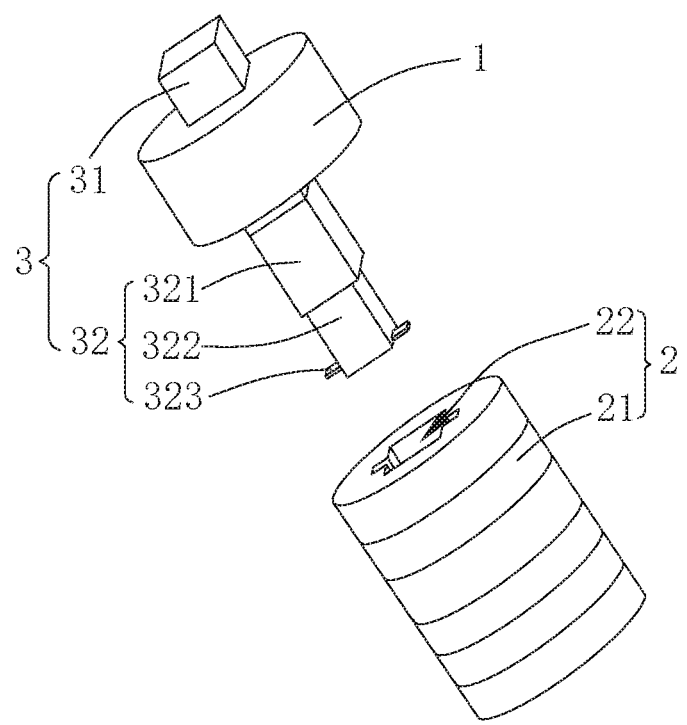
FIG. 2 is an exploded partial perspective structural schematic view of a machining tool according to an embodiment of the present disclosure.

Referring to FIGS. 1-2 at the same time, the present disclosure provides a machining tool 100 for cutting wafer level glass lenses. The machining tool 100 includes a tool head 1, a tool shank 2, a fixing shaft 3, and a glue layer (not shown in the drawing).

The tool head 1 is used for contacting a workpiece to be processed and processing the workpiece, the processing including grinding, direct cutting, rotary-polishing cutting, and the like. For example, the tool head 1 can be made of a material having high hardness such as steel or diamond, and thus has good wear resistance and a long service life.

The tool shank 2 includes a body 21 and a fixing recess 22 formed by recessing from one end of the body 21 in an axial direction of the body 21.

The body 21 is used for mounting and fixing. In order to prevent slippage after fixing, in an embodiment, a surface of the tool shank 2 is provided with an anti-slip pattern (not shown in the drawing). Namely, the anti-slip pattern is provided on an outer surface of the body 21. The fixing recess 22 is used for receiving and fixing the fixing shaft 3. In an embodiment, a shape of the fixing recess 22 matches a shape of a portion of the fixing shaft 3 that is inserted into the fixing recess 22.

The fixing shaft 3 is used to fix the tool head 1 to the tool shank 2. The fixing shaft 3 includes a shaft body 31 formed by extending from the tool head 1, and a shaft extension 32 extending from the shaft body 31 in a direction facing away from the tool head 1.

In an embodiment, the tool head 1 is connected to the tool shank 2 via the fixing shaft 3. As a result, there can be various connection relationship between the tool head 1 and the fixing shaft 31. For example, the shaft body 31 and the tool head 1 are formed into one piece, and the two are fixedly connected; alternatively, the shaft body 31 is a portion of the extension of the tool head 1, i.e., the shaft body 31 and the tool head 1 are made of the same material as a unitary structure; alternatively, the structure by which the shaft body 31 is fixedly connected to the tool head 1 is the same as the structure in which the shaft extension 32 is fixedly connected to the tool shank 2. It is appreciated that, it is not limited to the above examples.

The fixing connection relationship between the fixing shaft 3 and the tool shank 2 is: the shaft extension 32 is inserted into the fixing recess 22 to achieve fixing.

In an embodiment, at least a portion of the shaft extension 32 has a non-circular cross-section, and the shape of the fixing recess 22 matches the shape of the shaft extension 32. Therefore, after the shaft extension 32 is inserted into the fixing recess 22, a limited fixing of the mechanical structure is formed, such that no relative rotation can occur between the shaft extension 32 and the fixing recess 22. Thus, when the machining tool 100 is used to grind the workpiece to be processed, it can be ensured that even if a relatively large external force is applied, the relative rotation between the fixing shaft 3 and the tool shank 2 does not occur, so the structural stability is good, thereby ensuring the processing precision.

In an embodiment, the shaft extension 32 includes a first section 321 extending from the shaft body 32, a second section 322 extending from the first section 321, and a reinforcing section 323.

A cross-section of at least one of the first section 321 and the second section 322 is non-circular, thereby forming the above limited fixing of the mechanical structure. For example, the cross-section of the first section 321 and the cross-section of the second section 322 each are one of a polygon, an ellipse, a waist, etc., and, without doubt, are not limited thereto. Polygons include triangles, rectangles (squares, orthogon), trapezoids, pentagons, hexagons, and so on. Preferably, the number of sides of the polygon is preferably smaller than that of the hexagon, and the larger the number of sides, the closer to a circle, and the lower the stability.

More preferably, a cross-sectional area of the first section 321 is larger than a cross-sectional area of the second section 322. Since the shape of the fixing recess 22 matches that of the shaft extension 32, a cross-sectional area of an end of the fixing recess 22 facing away from a bottom of the recess is larger than a cross-sectional area of an end close to the bottom of the recess. Therefore, such a structure allows the shaft extension 32 to be smoothly inserted into the fixing recess 22, to quickly complete the assembly. Moreover, through variation in the cross-sectional areas of different sections, a load that is different from the case of the fixing recess 22 is formed, thereby effectively increasing relative fixing substantiality of the shaft extension 32 and the fixing recess 22 and thus further improving the stability.

The above purpose can be achieved simply by configuring at least one of the cross-sections of the first section 321 and the second section 322 to be non-circular. It is appreciated that, the cross-section of the first section 321 and the cross-section of the second section 322 may both be non-circular. Shapes of the cross-sections of the first section 321 and the second section 322 may be the same or different. In an embodiment, the shape of the cross-section of the first section 321 is the same as the shape of the cross-section of the second section 322.

When the cross-sections of the first section 321 and the second section 322 are both non-circular, the reliability is stronger; while when one of the cross-sections of the first section 321 and the second section 322 is non-circular and the other is circular, the technical problem proposed by the present disclosure can also be solved to achieve the purpose of preventing relative rotation between the fixing shaft 3 and the tool shank 2, and in this case, the processing of the fixing shaft 3 is simpler and faster.

The reinforcing section 323 is formed by an end of the second section 322 facing away from the first section 321 extending in a direction perpendicular to the first section 321. It is appreciated that, the reinforcing section 323 is not an indispensable structure, but the arrangement of the reinforcing section 323 forms a further locking. In this case, since the shape of the fixing recess 22 matches that of the shaft extension 32, i.e., a position of a bottom end of the fixing recess 22 facing away from the tool head 1 corresponds to forming of a limiting space which matches the reinforcing section 323, so that the fixing of the shaft extension 32 and the fixing recess 22 is more reliable.

In an embodiment, there are two reinforcing sections 323 symmetrically disposed with respect to the second section 322, so load of the structure is balanced, resulting in good stability.

The glue layer is filled between the shaft extension 32 and the fixing recess 22, for reinforcing the fixing strength of the two.

In an embodiment, the glue layer is formed by curing of the glue. After the glue layer is filled and before it is cured, the machining tool is placed in an ultrasonic oscillator and a recess opening of the fixing recess 22 is configured to face upward. An oscillating treatment is performed by the ultrasonic oscillator, so that the glue enters a gap between the fixing recess 22 and the shaft extension 32 more sufficiently and effectively after the ultrasonic oscillation. When the glue is cured, the glue layer is formed. The glue layer can be regarded as being sleeved on the shaft extension 32. Therefore, in one aspect, it functions to fixedly connect the fixing recess 22 to the shaft extension 32 and, in another aspect, since glue of the glue layer is changed from a liquid state to a solid state, it has a slightly increased volume and has elasticity, such that an interference fit is formed between the fixing recess 22 and the shaft extension 32. Namely, the fixing strength between the shaft extension 32 and the fixing recess 22 is further enhanced, thereby preventing the relative rotation between the two, improving the reliability and effectively ensuring the processing precision.

Compared with the related art, in the machining tool of the present disclosure, the connecting shaft includes a shaft body extending from the tool head and a shaft extension extending from the shaft body, and the shaft extension is inserted into the fixing recess of the tool shank to form a fixing. Since the cross-section of the shaft extension is non-circular and the shape of the fixing recess matches the shape of the shaft extension, a mechanical limiting fixing is formed after the shaft extension is inserted into the fixing recess, so that the relative rotation between the shaft extension and the fixing recess will not occur, thereby achieving a stable structure and high processing precision and good reliability in the processing process with machining tool.

What have been described above are only some embodiments of the present disclosure, and it should be noted herein that one ordinary person skilled in the art can make improvements without departing from the inventive concept of the present disclosure, but these are all within the scope of the present disclosure.

What is claimed is:

1. A machining tool, comprising:
   a tool head configured to contact a workpiece to be processed and process the workpiece;
   a tool shank comprising a body and a fixing recess formed by recessing from one end of the body in an axial direction of the body; and
   a fixing shaft comprising a shaft body formed by extending from the tool head and a shaft extension extending from the shaft body in a direction facing away from the tool head,
   wherein the shaft extension is inserted into the fixing recess to achieve fixing; and
   at least a portion of the shaft extension has a non-circular cross-section, and a shape of the fixing recess matches a shape of the shaft extension;
   the machining tool further comprises a glue layer filled between the shaft extension and the fixing recess.

2. The machining tool as described in claim 1, wherein the shaft extension comprises a first section extending from the shaft body and a second section extending from the first section, a cross-section of at least one of the first section and the second section is non-circular, and a cross-sectional area of the first section is larger than a cross-sectional area of the second section.

3. The machining tool as described in claim 2, wherein the cross-section of the first section and the cross-section of the second section are both non-circular.

4. The machining tool as described in claim 3, wherein the cross-section of the first section and the cross-section of the second section have same shapes.

5. The machining tool as described in claim 3, wherein each of the cross-section of the first section and the cross-section of the second section has a shape selected from a group consisting of a triangle, a rectangle, a trapezoid, a pentagon, a hexagon, an ellipse, a waist, or combinations thereof.

6. The machining tool as described in claim 1, wherein after the glue layer is filled and before it is cured, the machining tool is subjected to an oscillating treatment by an ultrasonic oscillator.

7. The machining tool as described in claim 1, wherein an anti-slip pattern is provided on a surface of the tool shank.

8. The machining tool as described in claim 2, wherein the shaft extension further comprises at least one reinforcing section, each of the at least one reinforcing section extending from an end of the second section facing away from the first section in a direction perpendicular to the first section.

9. The machining tool as described in claim 8, wherein the at least one reinforcing section comprises two reinforcing sections are provided, and the two reinforcing sections are symmetrically provided with respect to the second section.

\* \* \* \* \*